J. F. PLATNER.
AUTOMATIC FEEDING GREASE CUP.
APPLICATION FILED MAR. 31, 1913.

1,101,092.

Patented June 23, 1914.

Witnesses:
A. A. Huebner
J. J. Graff.

Inventor:
Joseph F. Platner
by Francis C. Huebner
his Attorney.

COLUMBIA PLANOGRAPH CO., WASHINGTON, D. C.

UNITED STATES PATENT OFFICE.

JOSEPH F. PLATNER, OF FRESNO, CALIFORNIA.

AUTOMATIC-FEEDING GREASE-CUP.

1,101,092.  Specification of Letters Patent.  Patented June 23, 1914.

Application filed March 31, 1913. Serial No. 757,830.

*To all whom it may concern:*

Be it known that I, JOSEPH F. PLATNER, a citizen of the United States, and a resident of the city of Fresno, county of Fresno, and State of California, have invented a new and useful Automatic-Feeding Grease-Cup, of which the following is a specification.

My invention relates to an automatic feeding grease cup which will regularly feed lubricant to the working parts of machinery when such machinery is in motion and which will not feed when the machine is at rest.

Figure 1:
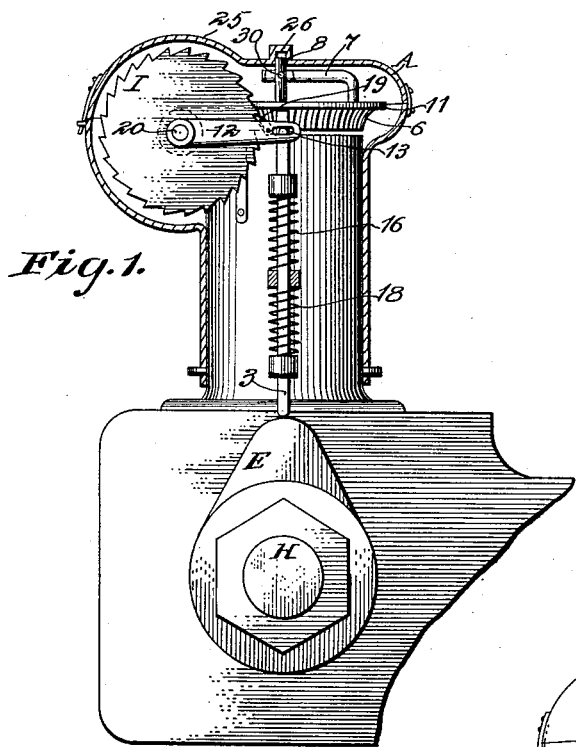
Figure 2:
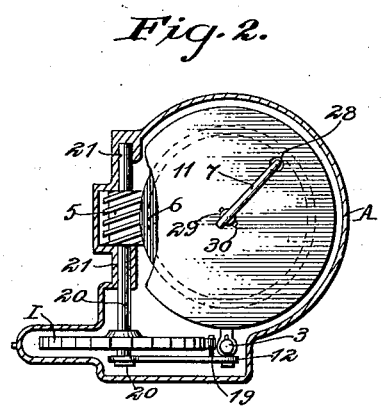
Figure 3:
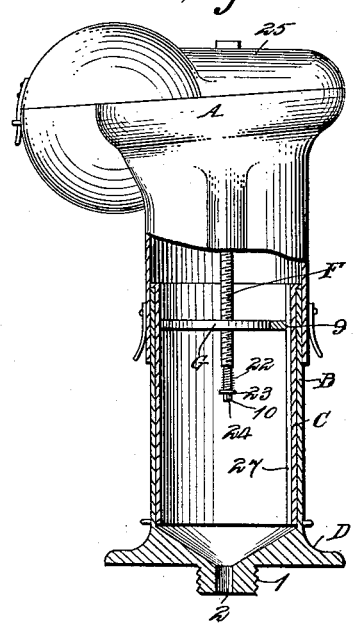
Figure 4:
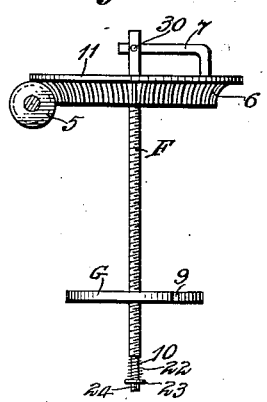

In the drawings which accompany this specification Figure 1 is an elevational view of the grease cup, with parts shown in section. Fig. 2 is an elevational top view of grease cup, with parts shown in section. Fig. 3 is an elevational view of the cup with part shown in section, and discloses the piston, and the lower end of the piston screw. Fig. 4 shows the screw, a portion of the mechanism for rotating such screw and the piston head.

In said drawings A is the housing covering the grease cup and the gears herein described.

B is the grease cup case, formed preferably of a tube which terminates at the bottom with a base D. Base D has a screw shank 1 thereon for the purpose of fastening said base to the machine to be lubricated. Lead 2 is an opening from the inside of the grease cup to the journal to be lubricated.

C is an inner casing or filing tube, consisting of a tube open at both ends, and which fits snugly inside of grease cup case B.

In Fig. 1, H is the shaft it is proposed to lubricate, E is a cam attached to said shaft H. 3 is a cam post which is operated vertically and parallel with grease cup case B as cam E rotates, and 16 is a spring which returns cam post 3 to its normal position when not forced upward by cam E.

18 is an equalizing spring which modifies the jar occasioned when cam E abuts cam post 3. The upper end of cam post 3 is pivoted to a lever 12 having a ratchet 19 attached thereto which engages with ratchet wheel I when said cam post 3 is moved upward. Ratchet wheel I is attached to a shaft 20 which runs in bearings 21 on the outside of grease cup case B. Shaft 20 has a worm 5 thereon which engages with worm gear 6. Worm gear 6 is of such diameter that the under surface covers the top of filling tube C and rides thereon when it is rotated. To worm gear 6 I have attached through the center thereof piston screw F and when lid 11 is adjusted piston screw F extends lengthwise through the center of the filling tube C. Piston screw F is the approximate length of filling tube C and is threaded almost its entire length.

G is a piston head which fits snugly in filling tube C having a groove 9 on the periphery which engages with the projection on filling tube C, and works on screw F. At the lower end of piston screw F I have cut off the threads (shown as 10 in Fig. 3) for a length slightly greater than the thickness of piston head G and have placed a hole for a key in the extreme lower end thereof.

I have rigidly attached a round plate 11 to the top of worm gear 6 with the center of plate 11 and worm gear 6 in common. The top of piston screw F passes through the center of worm gear 6 and plate 11, and to the top of piston screw F I have placed a male bearing 8 which operates in a corresponding female bearing 26 on the under side of the lid 25 of housing A. The said male bearing 8 and bearing 26 are in contact when lid 25 is closed, and not in contact when said lid is open.

Fig. 2 shows a top view of plate 11 which plate I have constructed with an eccentric hole 28 therein, and a hole 29 in the center thereof through which the top of screw piston F passes. To lock piston screw F to worm gear 6 and to keep the worm gear from sliding upward on piston screw F I have pivoted a rod 7 with pivot 30 to the top of piston screw F and immediately adjacent thereto. On one end of rod 7 I have formed a right angle extension 26 which fits into eccentric hole 28.

In assembling my grease cup I screw piston head G on piston screw F, then place spring 22 on the lower end of said piston screw and to prevent the spring from coming off I use a washer 23 on the extreme lower end of said piston screw and hold the same in place with a key 24. The object of this construction is to prevent losing the piston head G from screw F when it is entirely unscrewed therefrom, and the spring bearing against the bottom of the piston head causes the threads to catch readily when the motion of the screw is reversed. The piston head is inserted in filling tube C with the groove 9 on piston head following inside lateral projection 27 in filling tube C. The object of this construction is to keep the piston from turning with piston screw F. I have preferably formed the lateral inside projection 27 by pressing the same therein which makes a corresponding fluting 32 on the outside of filling tube C. The housing lid 25 is replaced with the bearing 26 engaging with bearing 8 on the top of piston screw F, and the grease cup is ready to feed the lubricant when the machine is in motion. As the shaft carrying cam 3 rotates, it communicates a reciprocating motion to cam post 3 which transmits motion through ratchet arm 12 by an oscillating movement to ratchet wheel I which transmits a rotary motion through shaft 20, to worm 5, thereon, engaging worm gear 6, which turns piston screw F, which screws piston head G on the lubricant, thus pressing it through lead 2 to the point to be lubricated.

What I claim as my invention and upon what I desire Letters Patent are:

In a grease cup the combination of a grease case, means for fastening such grease case to the machine to be lubricated, a lead from the inner chamber of such grease case to the part of the machine to be lubricated, a piston head slidable in such grease case, a threaded hole in the center of such piston head, a screw adapted to fit such threaded hole, means for turning such screw, a pintle bearing at the top of such screw, an extension at the lower end of such screw which slides readily through the threaded hole in the piston head, means attached to the lower end of such extension to prevent the piston head from coming off such extension, and means to yieldingly press the piston head upward on such extension, all substantially as described.

JOSEPH F. PLATNER.

Witnesses:
 BILL MONTGOMERY,
 MADGE BUCK.

---

Copies of this patent may be obtained for five cents each, by addressing the "Commissioner of Patents, Washington, D. C."